US012267022B2

(12) United States Patent
Hanada et al.

(10) Patent No.: US 12,267,022 B2
(45) Date of Patent: Apr. 1, 2025

(54) POWER CONVERSION DEVICE, POWER CONVERSION METHOD, AND PROGRAM

(71) Applicant: KABUSHIKI KAISHA YASKAWA DENKI, Fukuoka (JP)

(72) Inventors: Toshihiro Hanada, Fukuoka (JP); Shoji Konakahara, Fukuoka (JP); Keisei Inoki, Fukuoka (JP); Masahiro Tanaka, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 205 days.

(21) Appl. No.: 17/757,865

(22) PCT Filed: Nov. 16, 2020

(86) PCT No.: PCT/JP2020/042672
§ 371 (c)(1),
(2) Date: Jun. 22, 2022

(87) PCT Pub. No.: WO2021/131398
PCT Pub. Date: Jul. 1, 2021

(65) Prior Publication Data
US 2023/0032286 A1 Feb. 2, 2023

(30) Foreign Application Priority Data
Dec. 27, 2019 (JP) .................... 2019-238908

(51) Int. Cl.
*H02M 5/293* (2006.01)
*H02M 1/00* (2007.01)
(Continued)

(52) U.S. Cl.
CPC ....... *H02M 5/2935* (2021.05); *H02M 1/0058* (2021.05); *H02M 5/297* (2013.01)

(58) Field of Classification Search
CPC .... H02M 5/297; H02M 5/271; H02M 5/2932; H02M 1/12; H02M 5/02; H02M 5/4585
See application file for complete search history.

(56) References Cited

U.S. PATENT DOCUMENTS

2015/0003136 A1* 1/2015 Inomata ............... H02M 5/293
363/163
2015/0085552 A1* 3/2015 Inomata ............... H02M 5/297
363/163

(Continued)

FOREIGN PATENT DOCUMENTS

EP          3 038 250 A1    6/2016
JP       2010 279084 A     12/2010

(Continued)

OTHER PUBLICATIONS

1. EESR issued on Nov. 28, 2023_EP Application No. 20907976.3.

(Continued)

*Primary Examiner* — Wei (Victor) Y Chan
(74) *Attorney, Agent, or Firm* — Osha Bergman Watanabe & Burton LLP

(57) ABSTRACT

A power conversion device 1 includes a matrix converter circuit 10 including a plurality of switching elements and being configured to perform bidirectional power conversion between alternating current power on a primary side and alternating current power on a secondary side, a power conversion control unit 114 configured to switch on and off the plurality of switching elements in unison with a carrier wave to cause an alternating current on the secondary side to follow a control command, and a carrier wave changing unit 116 configured to change, based on a nearness level between a frequency on the primary side and a frequency on the secondary side, a frequency of the carrier wave.

6 Claims, 14 Drawing Sheets

(51) Int. Cl.
*H02M 5/275* (2006.01)
*H02M 5/297* (2006.01)

(56) References Cited

U.S. PATENT DOCUMENTS

| | | | |
|---|---|---|---|
| 2015/0085553 A1* | 3/2015 | Kinomura | H02M 5/293 363/163 |
| 2015/0102797 A1* | 4/2015 | Kinomura | H02M 5/293 323/311 |
| 2015/0115906 A1* | 4/2015 | Ebisu | H02M 5/293 323/217 |
| 2015/0130432 A1* | 5/2015 | Yamazaki | H02M 5/297 323/272 |
| 2016/0094140 A1* | 3/2016 | Yamazaki | H02M 5/297 363/163 |
| 2018/0309378 A1 | 10/2018 | Hanada et al. | |

FOREIGN PATENT DOCUMENTS

| | | |
|---|---|---|
| JP | 2011 019352 A | 1/2011 |
| JP | 2015-82949 A | 4/2015 |
| JP | 2016-067169 A | 4/2016 |
| JP | 2018-183018 A | 11/2018 |

OTHER PUBLICATIONS

Kwak S et al: "An Approach to Fault-Tolerant Three-Phase Matrix Converter Drives", IEEE Transactions on Energy Conversion, IEEE Service Center, Piscataway, NJ, US, vol. 22, No. 4, Dec. 1, 2007 (Dec. 1, 2007), pp. 855-863, XP011196268,ISSN: 0885-8969, DOI:10. 1109/TEC.2006.888018* Section IV. Simulation Result; Section V. Experimental Result; figure 12a.

* cited by examiner

POWER CONVERSION DEVICE, POWER CONVERSION METHOD, AND PROGRAM

TECHNICAL FIELD

The present disclosure relates to a power conversion device, a power conversion method, and a program.

BACKGROUND ART

Patent Document 1 discloses a matrix converter including a plurality of bidirectional switches connecting phases of an alternating current power source and phases of an alternating current device. The matrix converter outputs electric power generated in the alternating current device to the alternating current power source and controls the alternating current device based on electric power supplied from the alternating current power source.

CITATION LIST

Patent Literature

Patent Document 1: JP 2016-67169 A

SUMMARY OF INVENTION

Technical Problem

The present disclosure provides a power conversion device effective in reducing heat generated in a switching element.

Solution to Problem

A power conversion device according to an aspect of the present disclosure includes a matrix converter circuit including a plurality of switching elements and being configured to perform bidirectional power conversion between alternating current power on a primary side and alternating current power on a secondary side, a power conversion control unit configured to switch on and off the plurality of switching elements in unison with a carrier wave to cause an alternating current on the secondary side to follow a control command, and a carrier wave changing unit configured to change, based on a nearness level between a frequency on the primary side and a frequency on the secondary side, a frequency of the carrier wave.

A power conversion method according to another aspect of the present disclosure includes switching on and off a plurality of switching elements of a matrix converter circuit in unison with a carrier wave to cause an alternating current on a secondary side of the matrix converter circuit to follow a control command, the matrix converter circuit being configured to perform bidirectional power conversion between alternating current power on a primary side and alternating current power on the secondary side, and changing, based on a nearness level between a frequency on the primary side and a frequency on the secondary side, a frequency of the carrier wave.

A program according to still another aspect of the present disclosure causes a power conversion device to execute switching on and off a plurality of switching elements of a matrix converter circuit in unison with a carrier wave to cause an alternating current on a secondary side of the matrix converter circuit to follow a control command, the matrix converter circuit being configured to perform bidirectional power conversion between alternating current power on a primary side and alternating current power on the secondary side, and changing, based on a nearness level between a frequency on the primary side and a frequency on the secondary side, a frequency of the carrier wave.

Advantageous Effects of Invention

According to the present disclosure, it is possible to provide a power conversion device effective in reducing heat generated in a switching element.

DESCRIPTION OF EMBODIMENTS

Embodiments will be described in detail below with reference to the drawings. In the description, elements which are the same or have the same function are given the same reference numbers, and redundant descriptions thereof are omitted.

Power Conversion Device

Figure 1:
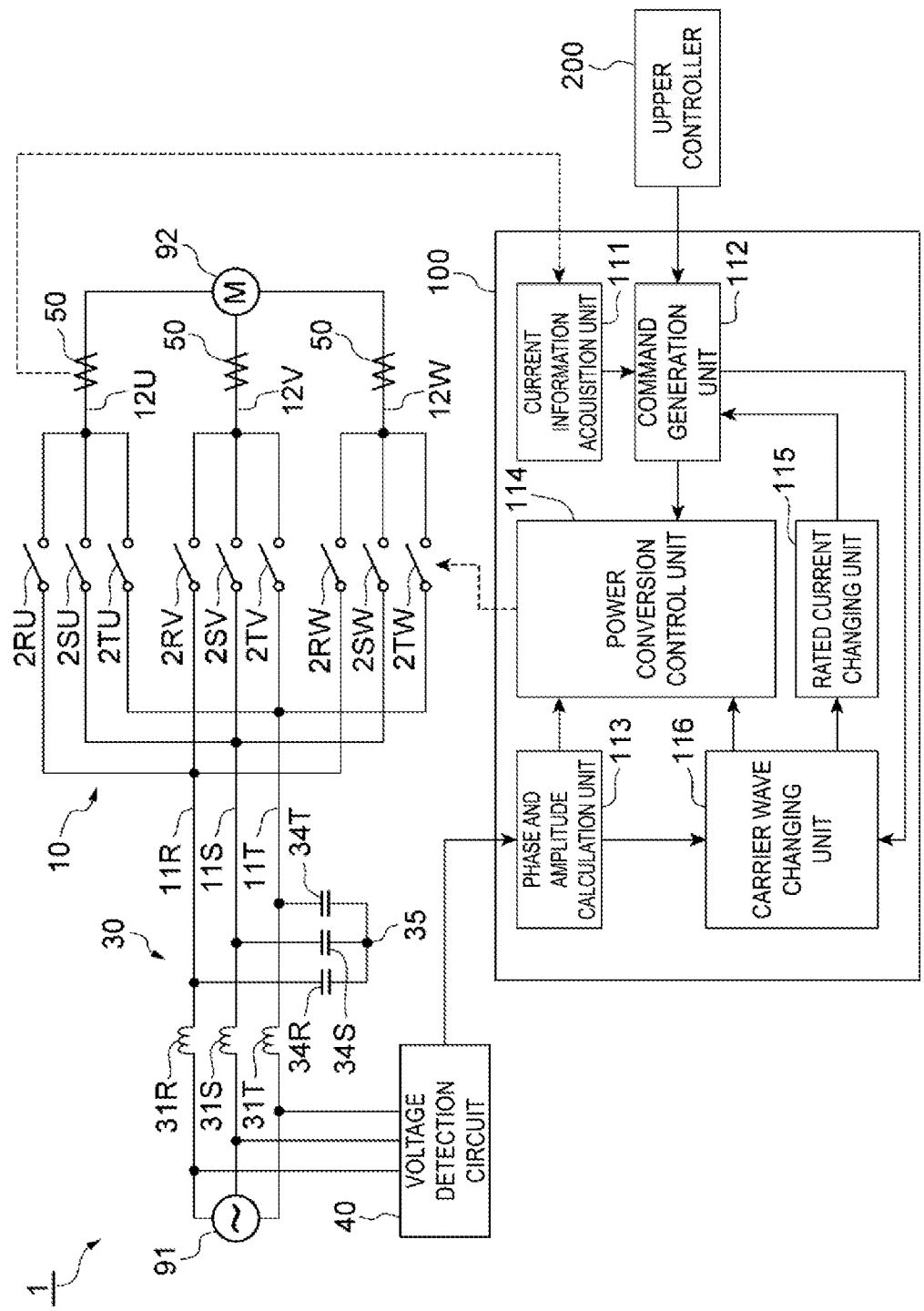
FIG. 1 is a schematic diagram illustrating an example of a configuration of a power conversion device.

A power conversion device 1 illustrated in FIG. 1 is a device that performs bidirectional power conversion between alternating current power on a primary side and alternating current power on a secondary side. For example, the power conversion device 1 converts the alternating current power on the primary side supplied from a power source 91 into the alternating current power on the secondary side and supplies the alternating current power on the secondary side to an electric motor 92. Further, the power conversion device 1 converts the alternating current power on the secondary side generated by the electric motor 92 (regenerative power) into the alternating current power on the primary side and supplies the alternating current power on the primary side to the power source 91.

The alternating current power on the primary side and the alternating current power on the secondary side may be single-phase alternating current power or may be three-phase alternating current power. In the following, a case in which the alternating current power on the primary side and the alternating current power on the secondary side are both three-phase alternating current power will be described. For example, the alternating current power on the primary side includes three phases referred to as an R phase, an S phase and a T phase, and the alternating current power on the secondary side includes three phases referred to as a U phase, a V phase, and a W phase.

The power conversion device 1 includes a matrix converter circuit 10, a filter 30, a voltage detection circuit 40, a current sensor 50, and a control circuit 100.

The matrix converter circuit 10 includes a plurality of switching elements, and performs bidirectional power conversion between the alternating current power on the primary side and the alternating current power on the secondary side. In this bidirectional power conversion, conversion into a direct current is not involved. For example, the matrix converter circuit 10 includes power lines on the primary side 11R, 11S, and 11T, the power lines on the secondary side 12U, 12V, and 12W, and nine bidirectional switches 2RU, 2SU, 2TU, 2RV, 2SV, 2TV, 2RW, 2SW, and 2TW. The power line 11R is a transmission line for the R phase, the power line 11S is a transmission line for the S phase, and the power line 11T is a transmission line for the T phase. The power line 12U is a transmission line for the U phase, the power line 12V is a transmission line for the V phase, and the power line 12W is a transmission line for the W phase.

Each of the bidirectional switches 2RU, 2SU, 2TU, 2RV, 2SV, 2TV, 2RW, 2SW, and 2TW switches among three states, which are a state in which the switch allows a current to flow from the primary side to the secondary side, a state in which the switch allows a current to flow from the secondary side to the primary side, and a state in which the switch does not allow a current to flow. The bidirectional switch 2RU is interposed between the power line 11R and the power line 12U, and switches among a first ON state in which the bidirectional switch 2RU allows a current to flow from the power line 11R to the power line 12U, a second ON state in which the bidirectional switch 2RU allows a current to flow from the power line 12U to the power line 11R, and a bidirectional OFF state in which the bidirectional switch 2RU does not allow a current to flow. The bidirectional switch 2SU is interposed between the power line 11S and the power line 12U, and switches among a first ON state in which the bidirectional switch 2SU allows a current to flow from the power line 11S to the power line 12U, a second ON state in which the bidirectional switch 2SU allows a current to flow from the power line 12U to the power line 11S, and a bidirectional OFF state in which the bidirectional switch 2SU does not allow a current to flow. The bidirectional switch 2TU is interposed between the power line 11T and the power line 12U, and switches among a first ON state in which the bidirectional switch 2TU allows a current to flow from the power line 11T to the power line 12U, a second ON state in which the bidirectional switch 2TU allows a current to flow from the power line 12U to the power line 11T, and a bidirectional OFF state in which the bidirectional switch 2TU does not allow a current to flow.

The bidirectional switch 2RV is interposed between the power line 11R and the power line 12V, and switches among a first ON state in which the bidirectional switch 2RV allows a current to flow from the power line 11R to the power line 12V, a second ON state in which the bidirectional switch 2RV allows a current to flow from the power line 12V to the power line 11R, and a bidirectional OFF state in which the bidirectional switch 2RV does not allow a current to flow. The bidirectional switch 2SV is interposed between the power line 11S and the power line 12V, and switches among a first ON state in which the bidirectional switch 2SV allows a current to flow from the power line 11S to the power line 12V, a second ON state in which the bidirectional switch 2SV allows a current to flow from the power line 12V to the power line 11S, and a bidirectional OFF state in which the bidirectional switch 2SV does not allow a current to flow. The bidirectional switch 2TV is interposed between the power line 11T and the power line 12V, and switches among a first ON state in which the bidirectional switch 2TV allows a current to flow from the power line 11T to the power line 12V, a second ON state in which the bidirectional switch 2TV allows a current to flow from the power line 12V to the power line 11T, and a bidirectional OFF state in which the bidirectional switch 2TV does not allow a current to flow.

The bidirectional switch 2RW is interposed between the power line 11R and the power line 12W, and switches among a first ON state in which the bidirectional switch 2RW allows a current to flow from the power line 11R to the power line 12W, a second ON state in which the bidirectional switch 2RW allows a current to flow from the power line 12W to the power line 11R, and a bidirectional OFF state in which the bidirectional switch 2RW does not allow a current to flow. The bidirectional switch 2SW is interposed between the power line 11S and the power line 12W, and switches among a first ON state in which the bidirectional switch 2SW allows a current to flow from the power line 11S to the power line 12W, a second ON state in which the bidirectional switch 2SW allows a current to flow from the power line 12W to the power line 11S, and a bidirectional OFF state in which the bidirectional switch 2SW does not allow a current to flow. The bidirectional switch 2TW is interposed between the power line 11T and the power line 12W, and switches among a first ON state in which the bidirectional switch 2TW allows a current to flow from the power line 11T to the power line 12W, a second ON state in which the bidirectional switch 2TW allows a current to flow from the power line 12W to the power line 11T, and a bidirectional OFF state in which the bidirectional switch 2TW does not allow a current to flow.

Figure 2:
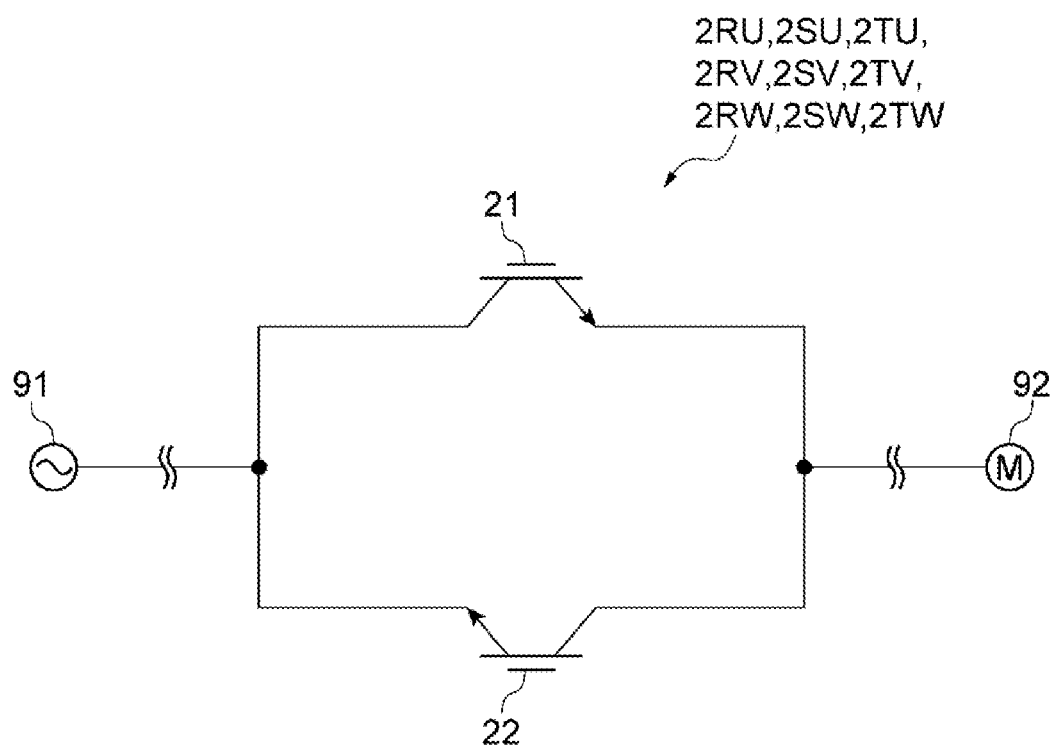
FIG. 2 is a schematic view illustrating a specific example of a bidirectional switch.

As illustrated in FIG. 2, each of the bidirectional switches 2RU, 2SU, 2TU, 2RV, 2SV, 2TV, 2RW, 2SW, and 2TW has two switches 21 and 22. The switch 21 in an ON state allows a current to flow from the primary side to the secondary side and does not allow a current to flow from the secondary side to the primary side. The switch 22 in an ON state allows a current to flow from the secondary side to the primary side and does not allow a current to flow from the primary side to the secondary side. In each of the bidirectional switches 2RU, 2SU, 2TU, 2RV, 2SV, 2TV, 2RW, 2SW, and 2TW, the above-described first ON state is a state where the switch 21 is in the ON state and the switch 22 is in the OFF state, the above-described second ON state is a state where the switch 21 is in the OFF state and the switch 22 is in the ON state, and the above-described bidirectional OFF state is a state where the switches 21 and 22 are in an OFF state.

Returning to FIG. 1, the filter 30 reduces harmonics in the alternating current power on the primary side. For example, the filter 30 includes inductors 31R, 31S, and 31T, and capacitors 34R, 34S, and 34T. The inductors 31R, 31S, and 31T are provided in the power lines 11R, 11S, and 11T, respectively. The capacitor 34R is provided on the secondary side of the inductor 31R (between the inductor 31R and the bidirectional switches 2RU, 2RV, and 2RW) and between the power line 11R and a neutral point 35. The capacitor 34S is provided on the secondary side of the inductor 31S (between the inductor 31S and the bidirectional switches 2SU, 2SV, and 2SW) and between the power line 11S and the neutral point 35. The capacitor 34T is provided on the secondary side of the inductor 31T (between the inductor 31T and the bidirectional switches 2TU, 2TV, and 2TW) and between the power line 11T and the neutral point 35. The voltage detection circuit 40 detects an alternating current voltage on the primary side. For example, the voltage detection circuit 40 detects a phase voltage of each of the power lines 11R, 11S, and 11T.

The current sensor 50 detects the magnitude of the current on the secondary side (the current flowing between the matrix converter circuit 10 and the electric motor 92). For example, the current sensor 50 detects the magnitude of currents of the power lines 12U, 12V, and 12W. The current sensor 50 may be configured to detect the magnitude of the currents for all of the power lines 12U, 12V, and 12W, or may be configured to detect the magnitude of the currents for two of the power lines 12U, 12V, and 12W. The sum of the magnitude of the currents of the U phase, V phase, and W phase is zero except in a case in which a zero phase current occurs, and thus the information of the magnitude of the currents of all the phases can be acquired even in a case in which the magnitudes of the currents of two phases are detected.

The control circuit 100 executes switching on and off the bidirectional switches 2RU, 2SU, 2TU, 2RV, 2SV, 2TV, 2RW, 2SW, and 2TW in unison with a carrier wave to cause the alternating current on the secondary side to follow a control command, and changing, based on a nearness level between a frequency on the primary side (the frequency of the alternating current on the primary side) and a frequency on the secondary side (the frequency of the alternating current on the secondary side), a frequency of the carrier wave. Causing the alternating current on the secondary side to follow the control command means causing a physical quantity relating to an electrical state of the alternating current power on the secondary side to follow the control command. Examples of the physical quantity relating to an electrical state include power, voltage, and current. The frequency of the alternating current means the frequency of the alternating current voltage or the frequency of the alternating current.

Specific examples of the control command include a voltage command. When the control command is a voltage command, the control circuit 100 switches on and off the bidirectional switches 2RU, 2SU, 2TU, 2RV, 2SV, 2TV, 2RW, 2SW, and 2TW to cause the alternating current voltage on the secondary side to follow the voltage command.

For example, the control circuit 100 includes, as functional components (hereinafter, referred to as "functional blocks"), a current information acquisition unit 111, a command generation unit 112, a phase and amplitude calculation unit 113, a power conversion control unit 114, a rated current changing unit 115, and a carrier wave changing unit 116. The current information acquisition unit 111 acquires current information of the power lines 12U, 12V, and 12W from the current sensor 50.

The command generation unit 112 generates a voltage command based on a frequency command and current information on the secondary side acquired by the current information acquisition unit 111. The command generation unit 112 acquires the frequency command from an upper controller 200, for example. Specific examples of the upper controller 200 include a programmable logic controller. For example, the command generation unit 112 calculates the voltage command such that operating speed of the electric motor 92 (for example, rotational speed) follows the frequency command.

The phase and amplitude calculation unit 113 calculates the phase, amplitude, and frequency of the alternating current voltage on the primary side, based on the phase voltages of the power lines 11R, 11S, and 11T acquired by the voltage detection circuit 40. Hereinafter, the calculation results of the phase, amplitude, and frequency are referred to as "voltage information on the primary side". The power conversion control unit 114 switches on and off the bidirectional switches 2RU, 2SU, 2TU, 2RV, 2SV, 2TV, 2RW, 2SW, and 2TW in unison with the carrier wave to cause the alternating current on the secondary side to follow the control command. For example, based on the voltage information on the primary side and the voltage command, the power conversion control unit 114 switches on and off the bidirectional switches 2RU, 2SU, 2TU, 2RV, 2SV, 2TV, 2RW, 2SW, and 2TW in unison with the carrier wave to cause the alternating current voltage on the secondary side to follow the voltage command.

The power conversion control unit 114 may switch on and off the bidirectional switches 2RU, 2SU, 2TU, 2RV, 2SV, 2TV, 2RW, 2SW, and 2TW based on a rated current on the secondary side so as to limit the magnitude of the current on the secondary side. For example, the command generation unit 112 may generate the voltage command such that the magnitude of the current on the secondary side is limited to be equal to or less than a current limit value determined based on the rated current. When the voltage command is generated in this way, the power conversion control unit 114 switches on and off the bidirectional switches 2RU, 2SU, 2TU, 2RV, 2SV, 2TV, 2RW, 2SW, and 2TW such that the magnitude of the current on the secondary side is limited to be equal to or less than the current limit value. In this case, the power conversion control unit 114 switches on and off the bidirectional switches 2RU, 2SU, 2TU, 2RV, 2SV, 2TV, 2RW, 2SW, and 2TW such that the bidirectional switches 2RU, 2SU, 2TU, 2RV, 2SV, 2TV, 2RW, 2SW, and 2TW have ON times which give a magnitude of the current equal to or less than the current limit value.

Figure 3:
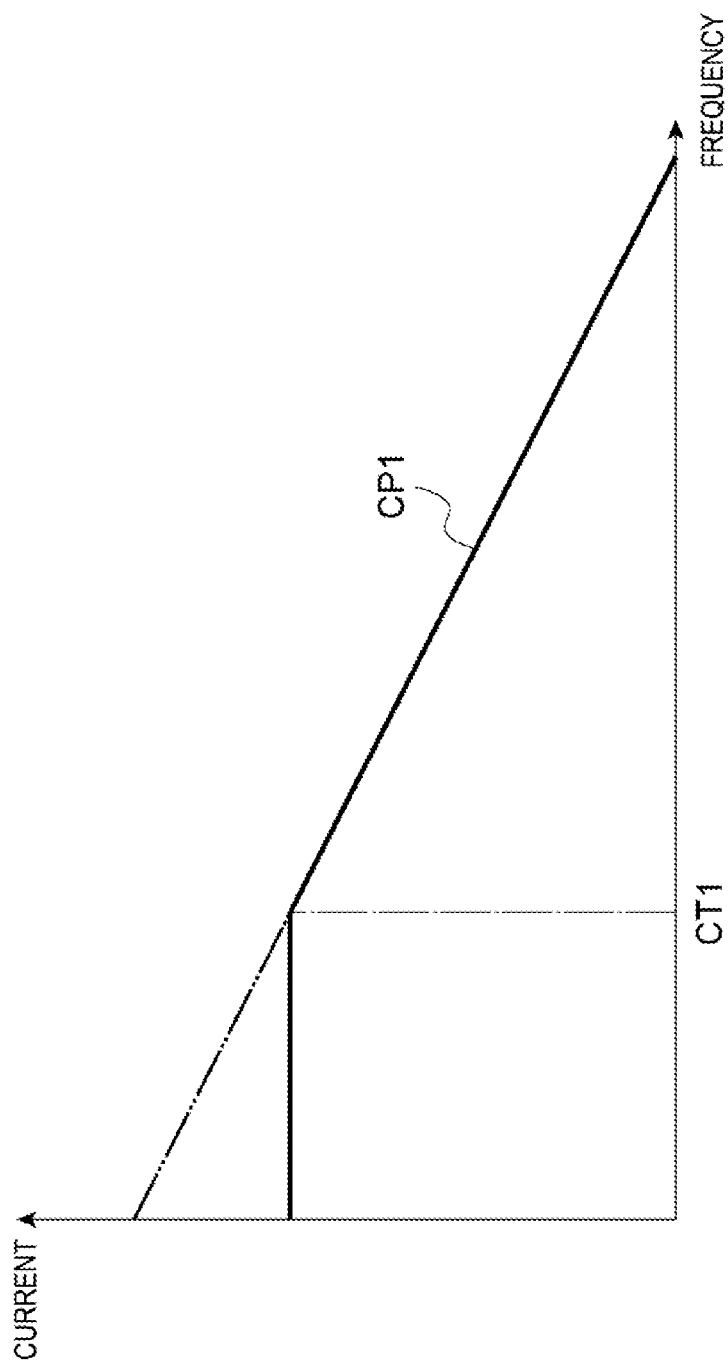
FIG. 3 is a graph of an example of a relationship between a frequency of a carrier wave and a rated current.

When the frequency of the carrier wave is higher than a predetermined threshold value (hereinafter, referred to as a "current adjustment threshold value"), the rated current changing unit 115 decreases the rated current on the secondary side in accordance with increase in the frequency of the carrier wave. When the frequency of the carrier wave is lower than the current adjustment threshold value, the rated current changing unit 115 sets the rated current on the secondary side to a fixed value. For example, as shown in FIG. 3, when the frequency of the carrier wave is higher than a current adjustment threshold value CT1, the rated current changing unit 115 calculates, based on an adjustment profile CP1 representing a relationship between the frequency of the carrier wave and the rated current on the secondary side, the rated current on the secondary side corresponding to the frequency of the carrier wave. The adjustment profile CP1 is defined so as to have the rated current on the secondary side decreasing in accordance with increase in the frequency of the carrier wave. In an example, the adjustment profile CP1 may be defined so as to have the rated current linearly decreasing with increase in the frequency of the carrier wave.

Here, power loss in each of the bidirectional switches 2RU, 2SU, 2TU, 2RV, 2SV, 2TV, 2RW, 2SW, and 2TW includes switching loss and steady loss. The switching loss is loss due to switching between the ON state and the OFF state. The steady loss is loss due to a current steadily flowing in the ON state.

When the frequency of the carrier wave is increased, the bidirectional switches 2RU, 2SU, 2TU, 2RV, 2SV, 2TV, 2RW, 2SW, and 2TW are more frequently switched on and off, and thus the switching loss increases. Therefore, when the steady loss is constant, the power loss increases in accordance with increase in the frequency of the carrier wave. In this case, if the rated current on the secondary side is decreased in accordance with increase in the frequency of the carrier wave, the steady loss decreases in accordance with increase in the frequency of the carrier wave. Thus, increase in the power loss in accordance with increase in the frequency of the carrier wave can be reduced.

As described above, when the frequency of the carrier wave is lower than the current adjustment threshold value, the rated current changing unit 115 sets the rated current to the fixed value. For example, the rated current changing unit 115 sets the rated current to a predetermined fixed current value, when the frequency of the carrier wave is lower than the current adjustment threshold value. The fixed current value may be a value of the rated current corresponding to the current adjustment threshold value in the adjustment profile CP1.

Returning to FIG. 1, the carrier wave changing unit 116 changes the frequency of the carrier wave based on a nearness level between the frequency on the primary side and the frequency on the secondary side. For example, the carrier wave changing unit 116 may change the frequency of the carrier wave based on the nearness level between the frequency on the primary side included in the above-described voltage information on the primary side and the frequency of the above-described voltage command. A method for evaluating the nearness level is not particularly limited as long as the nearness level indicates a degree of nearness between the frequency on the primary side and the frequency of the voltage command. For example, the carrier wave changing unit 116 may evaluate the nearness level based on the absolute value of the difference between the frequency on the primary side and the frequency of the voltage command.

In an example, a variable range of the frequency on the secondary side provided by the power conversion control unit 114 includes a first frequency band including the same frequency as the frequency on the primary side, a second frequency band lower than the first frequency band, and a third frequency band higher than the first frequency band. Here, that "one of bands (hereinafter, referred to as a "particular band") is lower than another of the bands" means that the maximum value of the particular band is equal to or less than the minimum value of the other band. That "the particular band is higher than another of the bands" means that the minimum value of the particular band is equal to or greater than the maximum value of the other band. The same applies hereinafter.

When the frequency on the secondary side is within the second frequency band, or when the frequency on the secondary side is within the third frequency band, the carrier wave changing unit 116 sets the frequency of the carrier wave to a first carrier frequency. When the frequency on the secondary side is within the first frequency band, the carrier wave changing unit 116 sets the frequency of the carrier wave to a second carrier frequency lower than the first carrier frequency.

The carrier wave changing unit 116 may use, as the first carrier frequency, a value equal to or higher than the current adjustment threshold value described above, and may use, as the second carrier frequency, a value lower than the current adjustment threshold value. The carrier wave changing unit 116 may use, as the second carrier frequency, a value higher than the cutoff frequency of the filter 30.

The variable range of the frequency on the secondary side provided by the power conversion control unit 114 may further include a fourth frequency band lower than the second frequency band, and when the frequency on the secondary side is within the fourth frequency band, the carrier wave changing unit 116 may set the frequency of the carrier wave to the second carrier frequency.

The carrier wave changing unit 116 may change the frequency of the carrier wave further based on the magnitude of the current on the secondary side. In an example, the variable range of the magnitude of the current on the secondary side provided by the power conversion control unit 114 may include a first current band and a second current band lower than the first current band.

When the magnitude of the current on the secondary side is within the second current band, the carrier wave changing unit 116 may not perform changing the frequency of the carrier wave based on the nearness level, and when the magnitude of the current on the secondary side is within the first current band, the carrier wave changing unit 116 may perform changing the frequency of the carrier wave based on the nearness level. For example, when the magnitude of the current on the secondary side is within the second current band, the carrier wave changing unit 116 sets the frequency of the carrier wave to the first carrier frequency. When the magnitude of the current on the secondary side is within the first current band, the carrier wave changing unit 116 changes the frequency of the carrier wave depending on which of the first frequency band, the second frequency band, the third frequency band, and the fourth frequency band the frequency on the secondary side falls within. For example, when the frequency on the secondary side is within the second frequency band, or when the frequency on the secondary side is within the third frequency band, the carrier wave changing unit 116 sets the frequency of the carrier wave to the first carrier frequency, and when the frequency on the secondary side is within the first frequency band, or when the frequency on the secondary side is within the fourth frequency band, the carrier wave changing unit 116 sets the frequency of the carrier wave to the second carrier frequency.

Figure 4:
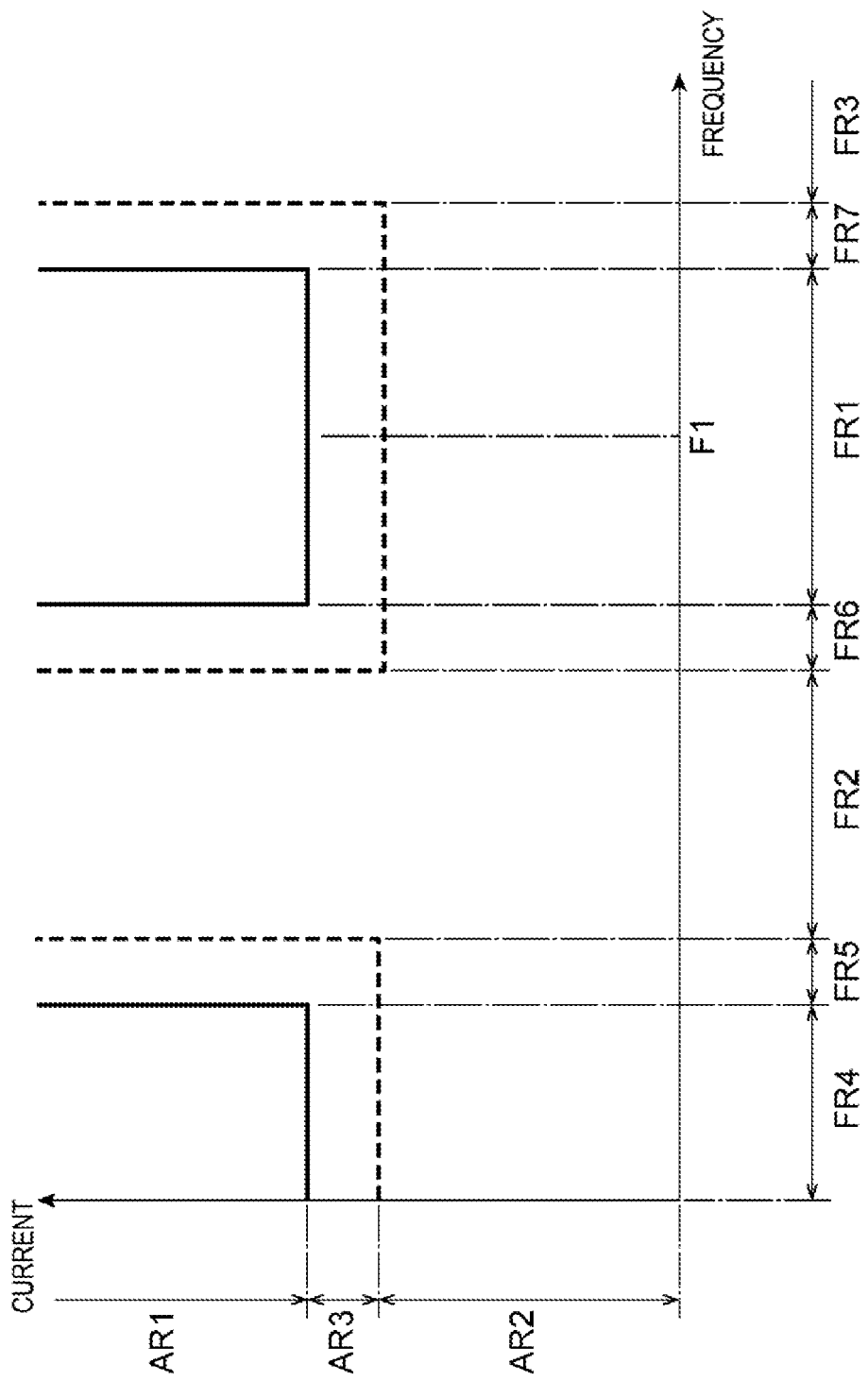
FIG. 4 is a graph of a setting example of frequency bands and current bands.

FIG. 4 is a graph of a setting example of the frequency bands and the current bands, where the vertical axis indicates the magnitude of the current on the secondary side, and the horizontal axis indicates the frequency on the secondary side. In FIG. 4, the variable range of the magnitude of the current on the secondary side provided by the power conversion control unit 114 includes a current band AR1 and a current band AR2 lower than the current band AR1. The minimum value of the current band AR1 is, for example, the rated current. The minimum value of the current band AR2 is zero, and the maximum value of the current band AR2 is equal to or less than the rated current. For example, the maximum value of the current band AR2 is less than the minimum value of the current band AR1, and a buffer band AR3 is interposed between the current band AR1 and the current band AR2.

The variable range of the frequency on the secondary side provided by the power conversion control unit 114 includes a frequency band FR1 (a first frequency band) including a frequency F1 equal to the frequency on the primary side, a frequency band FR2 (a second frequency band) lower than the frequency band FR1, a frequency band FR3 (a third frequency band) higher than the frequency band FR1, and a frequency band FR4 (a fourth frequency band) lower than the frequency band FR2.

For example, the minimum value of the frequency band FR1 is 85 to 95% of the frequency F1, the maximum value of the frequency band FR1 is 105 to 110% of the frequency F1, the minimum value of the frequency band FR4 is zero, and the maximum value of the frequency band FR4 is 5 to 15% of the frequency F1. The minimum value of the frequency band FR2 is equal to or greater than the maximum value of the frequency band FR4. For example, the minimum value of the frequency band FR2 is more than the maximum value of the frequency band FR4, and a buffer band FR5 is interposed between the frequency band FR4 and the frequency band FR2. The maximum value of the frequency band FR2 is equal to or less than the minimum value of the frequency band FR1. For example, the maximum value of the frequency band FR2 is less than the minimum value of the frequency band FR1, and a buffer band FR6 is interposed between the frequency band FR2 and the frequency band FR1. The minimum value of the frequency band FR3 is equal to or greater than the maximum value of the frequency band FR1. For example, the minimum value of the frequency band FR3 is more than the maximum value of the frequency band FR1, and a buffer band FR7 is interposed between the frequency band FR1 and the frequency band FR3.

In the example of FIG. 4, when the magnitude of the current on the secondary side is within the current band AR2, the carrier wave changing unit 116 sets the frequency of the carrier wave to the first carrier frequency. When the magnitude of the current on the secondary side is within the current band AR1, the carrier wave changing unit 116 changes the frequency of the carrier wave depending on which of the frequency bands FR1, FR2, FR3, and FR4 the frequency on the secondary side falls within. For example, when the frequency on the secondary side is within the frequency band FR2, or when the frequency on the secondary side is within the frequency band FR3, the carrier wave changing unit 116 sets the frequency of the carrier wave to the first carrier frequency, and when the frequency on the secondary side is within the frequency band FR1, or when the frequency on the secondary side is within the frequency band FR4, the carrier wave changing unit 116 sets the frequency of the carrier wave to the second carrier frequency. When the frequency on the secondary side is within the buffer band FR5, or when the frequency on the secondary side is within the buffer band FR6, or when the frequency on the secondary side is within the buffer band FR7, the carrier wave changing unit 116 does not change the frequency of the carrier wave.

As described above, when the magnitude of the current on the secondary side is within the current band AR1, the frequency of the carrier wave is changed depending on which of the frequency bands FR1, FR2, FR3, and FR4 the frequency on the secondary side falls within, and thus the current band AR1 is an example of the above-described first current band.

In a case where the magnitude of the current on the secondary side is within the buffer band AR3, when the frequency on the secondary side is within the frequency band FR2, or when the frequency on the secondary side is within the frequency band FR3, the carrier wave changing unit 116 sets the frequency of the carrier wave to the first carrier frequency. In a case where the magnitude of the current on the secondary side is within the buffer band AR3, when the frequency on the secondary side is out of the frequency band FR2 and the frequency on the secondary side is out of the frequency band FR3, the carrier wave changing unit 116 does not change the frequency of the carrier wave. In the case where the magnitude of the current on the secondary side is within the buffer band AR3, changing the frequency of the carrier wave from the first carrier frequency to the second carrier frequency does not occur, because, in this case, the frequency of the carrier wave is not changed, even when the frequency on the secondary side is within the frequency band FR1 or FR4. On the other hand, when the frequency on the secondary side falls within the frequency band FR2 or FR3, the frequency of the carrier wave may be changed from the second carrier frequency to the first carrier frequency. Examples of such a case include a case where, in a state where the frequency of the carrier wave is held at the second carrier frequency after the magnitude of the current on the secondary side was changed, when the frequency on the secondary side was within the frequency band FR4, from a value within the current band AR1 to a value within the buffer band AR3, the frequency on the secondary side is changed through the buffer band FR5 to a frequency within the frequency band FR2. Thus, the buffer band AR3 is also an example of the above-described first current band.

The functional blocks described above are components of the control circuit 100, and thus processing executed by these functional blocks is equivalent to processing executed by the control circuit 100.

Figure 5:
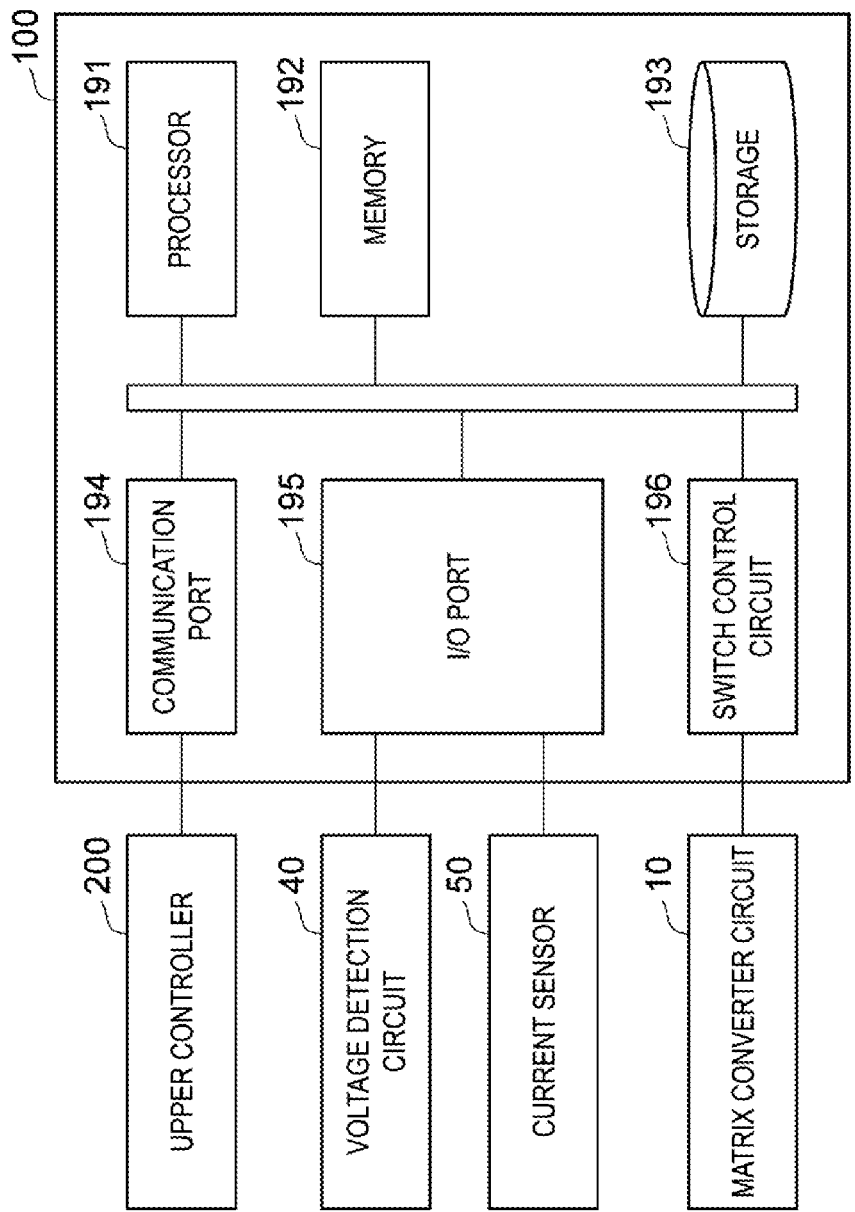
FIG. 5 is a block diagram illustrating an example of a hardware configuration of a control circuit.

FIG. 5 is a block diagram illustrating an example of a hardware configuration of the control circuit 100. As illustrated in FIG. 5, the control circuit 100 includes one or more processors 191, a memory 192, a storage 193, a communication port 194, an I/O port 195, and a switch control circuit 196. The storage 193 includes a computer-readable storage medium such as a non-volatile semiconductor memory, for example. The storage 193 stores a program causing the power conversion device to execute switching on and off the plurality of switching elements of the matrix converter circuit in unison with the carrier wave to cause the alternating current on the secondary side of the matrix converter circuit to follow the control command, the matrix converter circuit being configured to perform bidirectional power conversion between the alternating current power on the primary side and the alternating current power on the secondary side, and changing, based on the nearness level between the frequency on the primary side and the frequency on the secondary side, the frequency of the carrier wave. The memory 192 temporarily stores programs loaded from the storage medium of the storage 193 and calculation results from the processor 191. The processor 191 implements each functional block of the control circuit 100 by executing the program described above in cooperation with the memory 192. The I/O port 195 inputs and outputs electric signals to and from the voltage detection circuit 40 and the current sensor 50 in accordance with commands from the processor 191. The communication port 194 performs information communication with the upper controller 200 in accordance with commands from the processor 191.

The switch control circuit 196 outputs, to the matrix converter circuit 10, a drive signal for switching on and off the bidirectional switches 2RU, 2SU, 2TU, 2RV, 2SV, 2TV, 2RW, 2SW, and 2TW, in accordance with commands from the processor 191.

Note that in the control circuit 100, the functions are not limited to being implemented by a program. For example, the control circuit 100 may implement at least one function by a dedicated logic circuit or an application specific integrated circuit (ASIC) integrated therewith.

Power Conversion Procedure

Next, as an example of the power conversion method, an example of a control procedure of the matrix converter circuit 10 executed by the control circuit 100 will be described. This procedure includes switching on and off the plurality of switching elements of the matrix converter circuit in unison with the carrier wave to cause the alternating current on the secondary side of the matrix converter circuit to follow the control command, the matrix converter circuit being configured to perform bidirectional power conversion between the alternating current power on the primary side and the alternating current power on the secondary side, and changing, based on the nearness level between the frequency on the primary side and the frequency on the secondary side, the frequency of the carrier wave.

Figure 6:
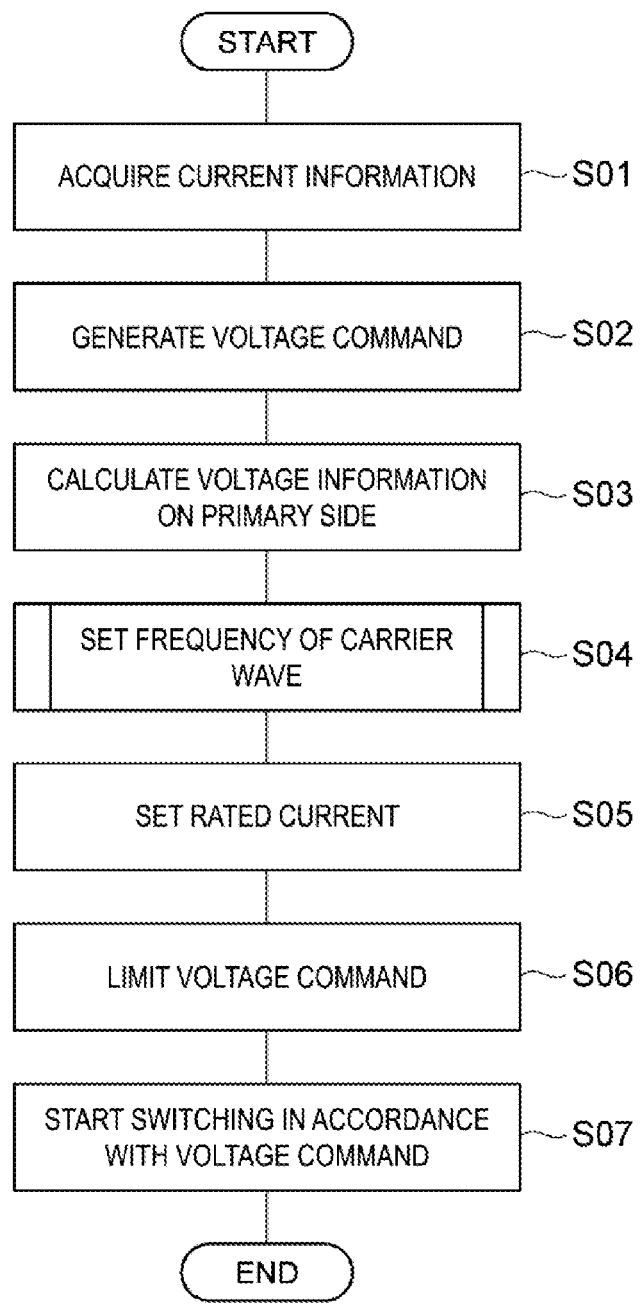
FIG. 6 is a flowchart illustrating an example of a control procedure of a matrix converter circuit.

As illustrated in FIG. 6, the control circuit 100 sequentially executes steps S01, S02, S03, S04, S05, S06, and S07. In step S01, the current information acquisition unit 111 acquires current information of the power lines 12U, 12V, and 12W from the current sensor 50. In step S02, the command generation unit 112 generates a voltage command based on a frequency command and the current information on the secondary side acquired by the current information acquisition unit 111.

In step S03, the phase and amplitude calculation unit 113 calculates, based on the phase voltages of the power lines 11R, 11S, and 11T acquired by the voltage detection circuit 40, the phase, amplitude, and frequency of the alternating current voltage on the primary side (the above-described voltage information on the primary side). In step S04, the carrier wave changing unit 116 sets, based on the magnitude of the current on the secondary side and the frequency on the secondary side, the frequency of the carrier wave. The setting procedure of the frequency of the carrier wave will be described below.

In step 505, the rated current changing unit 115 sets the rated current on the secondary side, based on the frequency of the carrier wave set in step S04. For example, when the frequency of the carrier wave is lower than the above-described current adjustment threshold value, the rated current changing unit 115 sets, to the above-described fixed current value, the rated current on the secondary side. When the frequency of the carrier wave is higher than the current adjustment threshold value, the rated current changing unit 115 sets, based on the above-described adjustment profile CP1 and the frequency of the carrier wave, the rated current on the secondary side. In step S06, the command generation unit 112 modifies the voltage command such that the magnitude of the current on the secondary side is limited to be equal to or less than the rated current. In step S07, the power conversion control unit 114 starts to switch on and off the bidirectional switches 2RU, 2SU, 2TU, 2RV, 2SV, 2TV, 2RW, 2SW, and 2TW in unison with the carrier wave to cause the alternating current on the secondary side to follow the control command. The control circuit 100 repeats the procedure described above in predetermined control cycles.

Figure 7:
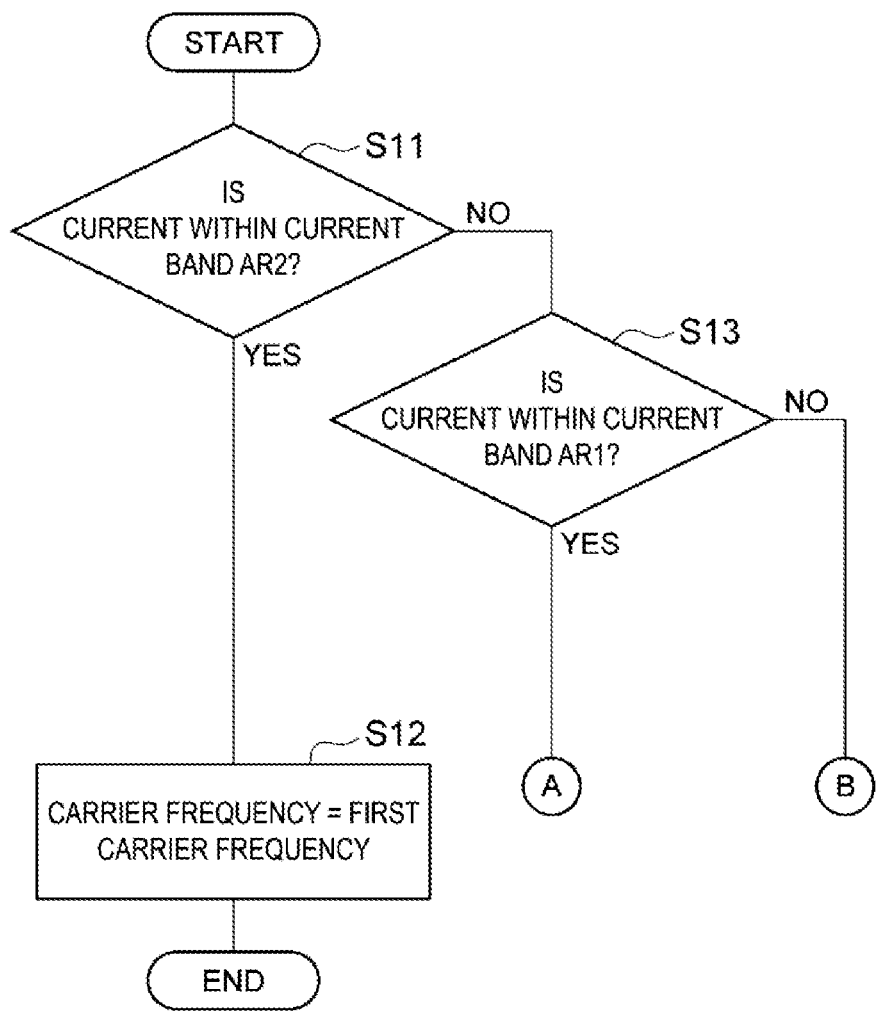
FIG. 7 is a flowchart illustrating an example of a setting procedure of the frequency of the carrier wave according to FIG. 4.

FIG. 7 is flowchart illustrating an example of a setting procedure of the frequency of the carrier wave in step S04. As illustrated in FIG. 7, the control circuit 100 first executes step S11. In step S11, the carrier wave changing unit 116 checks whether the magnitude of the current on the secondary side is within the current band AR2. In a case in which it is determined in step S11 that the magnitude of the current on the secondary side is within the current band AR2, the control circuit 100 executes step S12. In step S12, the carrier wave changing unit 116 sets the frequency of the carrier wave to the above-described first carrier frequency.

In a case in which it is determined in step S11 that the magnitude of the current on the secondary side is not within the current band AR2, the control circuit 100 executes step S13. In step S13, the carrier wave changing unit 116 checks whether the magnitude of the current on the secondary side is within the current band AR1.

Figure 8:
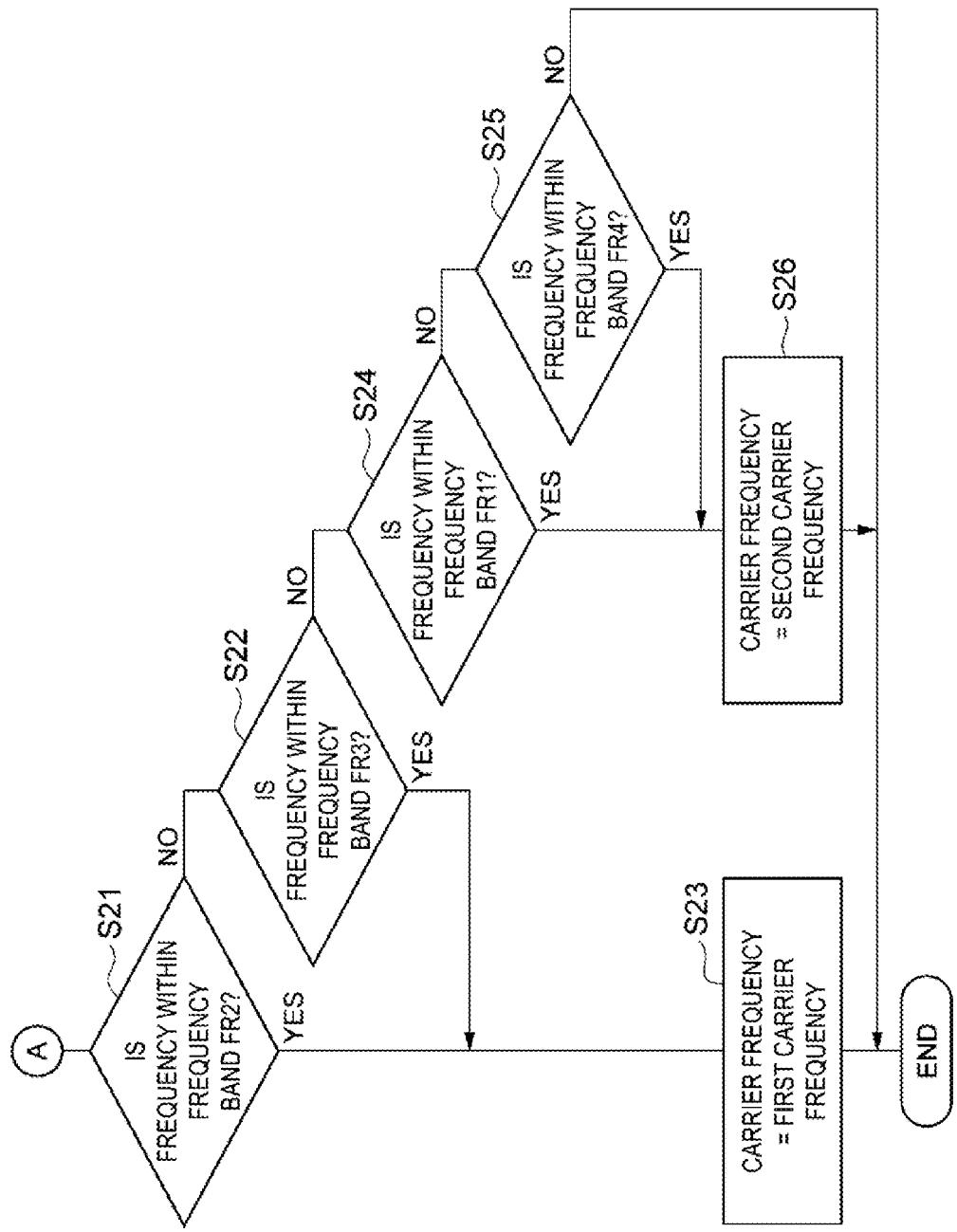
FIG. 8 is a flowchart illustrating an example of the setting procedure of the frequency of the carrier wave according to FIG. 4.

In a case in which it is determined in step S13 that the magnitude of the current on the secondary side is within the current band AR1, the control circuit 100 executes step S21, as illustrated in FIG. 8. In step S21, the carrier wave changing unit 116 checks whether the frequency on the secondary side is within the frequency band FR2. In a case in which it is determined in step S21 that the frequency on the secondary side is not within the frequency band FR2, the control circuit 100 executes step S22. In step S22, the carrier wave changing unit 116 checks whether the frequency on the secondary side is within the frequency band FR3. In a case in which it is determined in step S21 that the frequency on the secondary side is within the frequency band FR2, or it is determined in step S22 that the frequency on the secondary side is within the frequency band FR3, the control circuit 100 executes step S23. In step S23, the carrier wave changing unit 116 sets the frequency of the carrier wave to the above-described first carrier frequency.

In a case in which it is determined in step S22 that the frequency on the secondary side is not within the frequency band FR3, the control circuit 100 executes step S24. In step S24, the carrier wave changing unit 116 checks whether the frequency on the secondary side is within the frequency band FR1. In a case in which it is determined in step S24 that the frequency on the secondary side is not within the frequency band FR1, the control circuit 100 executes step S25. In step S25, the carrier wave changing unit 116 checks whether the frequency on the secondary side is within the frequency band FR4. In a case in which it is determined in step S24 that the frequency on the secondary side is within the frequency band FR1, or it is determined in step S25 that the frequency on the secondary side is within the frequency band FR4, the control circuit 100 executes step S26. In step S26, the carrier wave changing unit 116 sets the frequency of the carrier wave to the above-described second carrier frequency.

In a case in which it is determined in step S25 that the frequency on the secondary side is not within the frequency band FR4, the carrier wave changing unit 116 does not perform changing the frequency of the carrier wave in accordance with the frequency on the secondary side.

Figure 9:
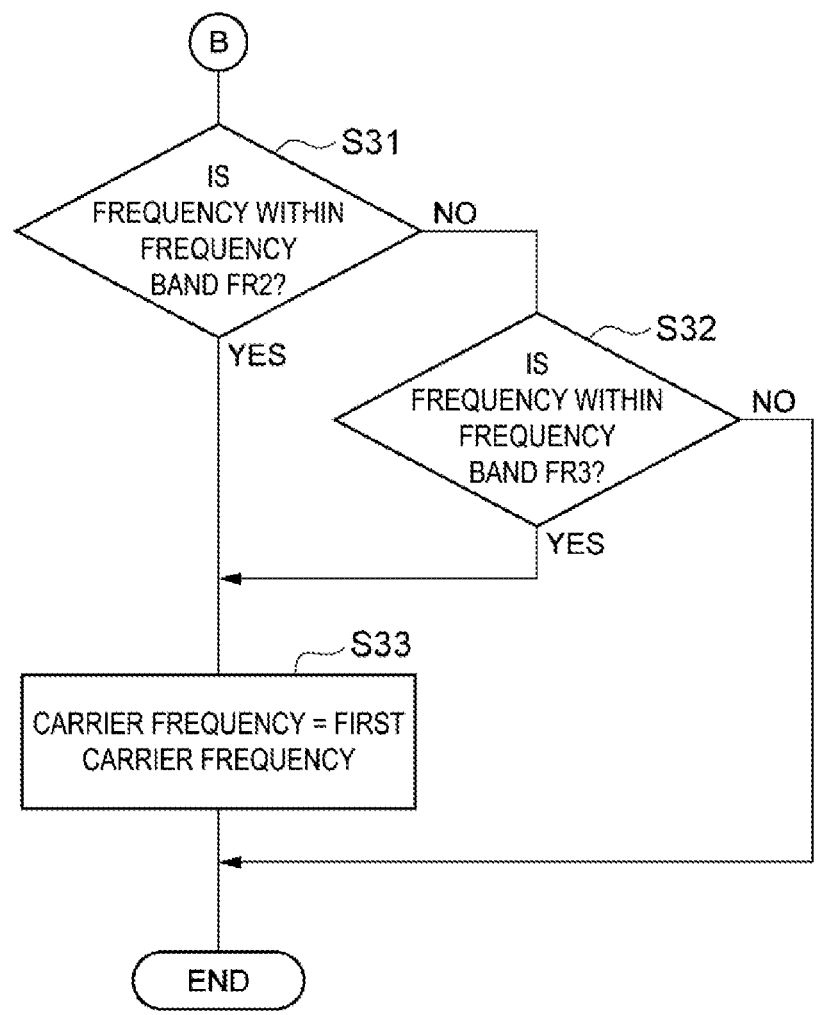
FIG. 9 is a flowchart illustrating an example of the setting procedure of the frequency of the carrier wave according to FIG. 4.

In a case in which it is determined in step S13 (see FIG. 7) that the magnitude of the current on the secondary side is not within the current band AR1, the control circuit 100 executes step S31, as illustrated in FIG. 9. In step S31, the carrier wave changing unit 116 checks whether the frequency on the secondary side is within the frequency band FR2. In a case in which it is determined in step S31 that the frequency on the secondary side is not within the frequency band FR2, the control circuit 100 executes step S32. In step S32, the carrier wave changing unit 116 checks whether the frequency on the secondary side is within the frequency band FR3. In a case in which it is determined in step S31 that the frequency on the secondary side is within the frequency band FR2, or it is determined in step S32 that the frequency on the secondary side is within the frequency band FR3, the control circuit 100 executes step S33. In step S33, the carrier wave changing unit 116 sets the frequency of the carrier wave to the above-described first carrier frequency.

In a case in which it is determined in step S32 that the frequency on the secondary side is not within the frequency band FR3, the carrier wave changing unit 116 does not perform changing the frequency of the carrier wave in accordance with the frequency on the secondary side. At this point, the setting of the frequency of the carrier wave is completed.

MODIFIED EXAMPLES

Figure 10:
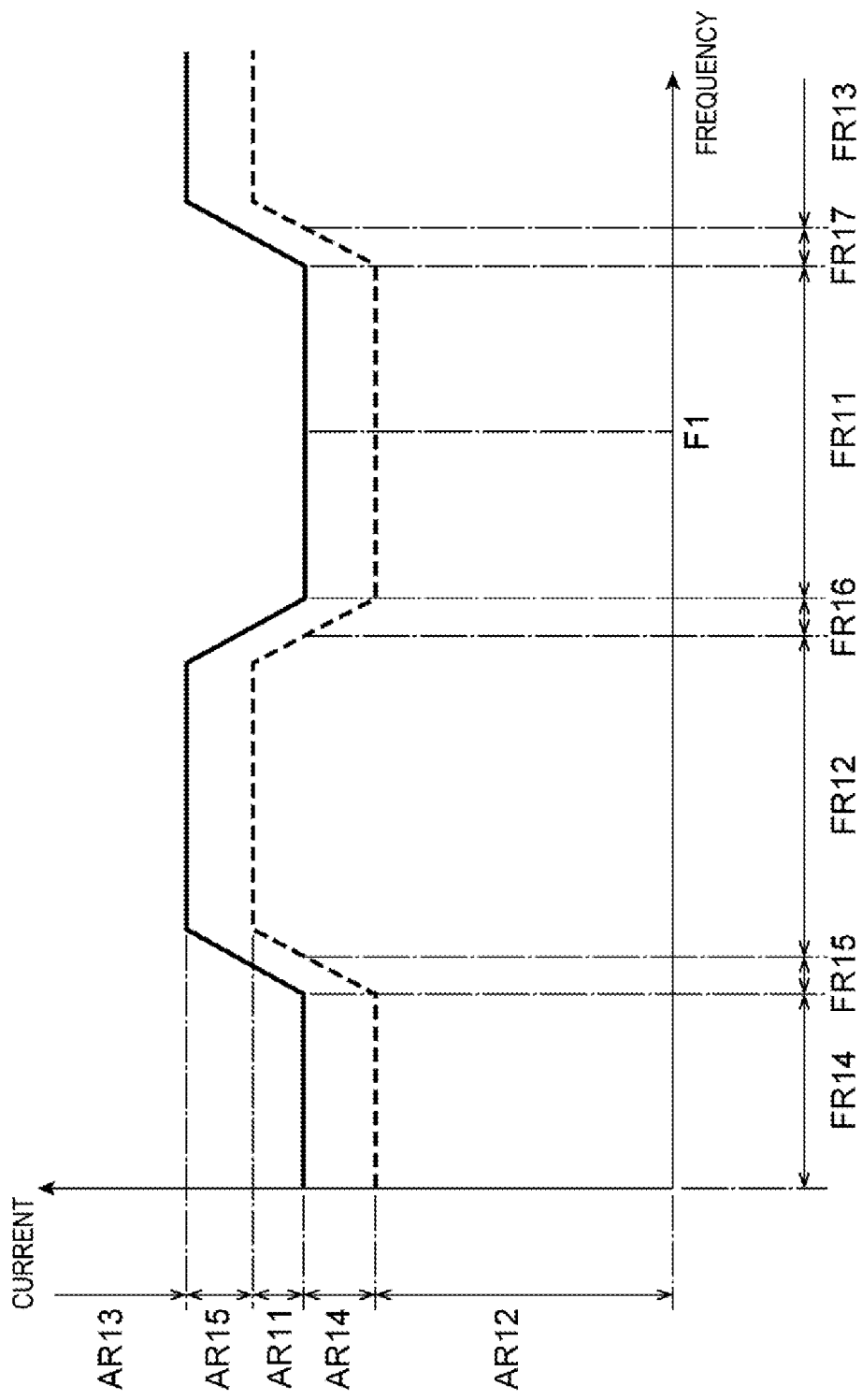
FIG. 10 is a graph of a modified example of the setting of frequency bands and current bands.

FIG. 10 is a graph of a modified setting example of the frequency bands and the current bands, where the vertical axis indicates the magnitude of the current on the secondary side, and the horizontal axis indicates the frequency on the secondary side. In FIG. 10, the variable range of the current on the secondary side provided by the power conversion control unit 114 includes a current band AR11, a current band AR12 lower than the current band AR11, and a current band AR13 higher than the current band AR11.

The minimum value of the current band AR11 is, for example, the rated current. The minimum value of the current band AR12 is zero, and the maximum value of the current band AR12 is equal to or less than the rated current. For example, the maximum value of the current band AR12 is less than the minimum value of the current band AR11, and a buffer band AR14 is interposed between the current band AR11 and the current band AR12.

The maximum value of the current band AR11 is, for example, 100 to 120% of the rated current. The minimum value of the current band AR13 is equal to or greater than the maximum value of the current band AR11. For example, the minimum value of the current band AR13 is more than the maximum value of the current band AR11, and a buffer band AR15 is interposed between the current band AR11 and the current band AR13.

The variable range of the frequency on the secondary side provided by the power conversion control unit 114 includes a frequency band FR11 (the first frequency band) including a frequency F1 equal to the frequency on the primary side, a frequency band FR12 (the second frequency band) lower than the frequency band FR11, a frequency band FR13 (the third frequency band) higher than the frequency band FR11, and a frequency band FR14 (the fourth frequency band) lower than the frequency band FR12. For example, the minimum value of the frequency band FR11 is 85 to 95% of the frequency F1, the maximum value of the frequency band FR11 is 105 to 110% of the frequency F1, the minimum value of the frequency band FR14 is zero, and the maximum value of the frequency band FR14 is 5 to 15% of the frequency F1.

The minimum value of the frequency band FR12 is equal to or greater than the maximum value of the frequency band FR14. For example, the minimum value of the frequency band FR12 is more than the maximum value of the frequency band FR14, and a buffer band FR15 is interposed between the frequency band FR14 and the frequency band FR12. The maximum value of the frequency band FR12 is equal to or less than the minimum value of the frequency band FR11. For example, the maximum value of the frequency band FR12 is less than the minimum value of the frequency band FR11, and a buffer band FR16 is interposed between the frequency band FR12 and the frequency band FR11. The minimum value of the frequency band FR13 is equal to or greater than the maximum value of the frequency band FR11. For example, the minimum value of the frequency band FR13 is more than the maximum value of the frequency band FR11, and a buffer band FR17 is interposed between the frequency band FR11 and the frequency band FR13.

The bandwidths of the frequency bands FR11, FR12, FR13, and FR14 may change depending on the magnitude of the current on the secondary side. For example, in FIG. 10, in accordance with increase in the current on the secondary side, the bandwidths of the frequency bands FR11 and FR14 increase and the bandwidths of the frequency bands FR12 and FR13 decrease.

In the example of FIG. 10, when the magnitude of the current on the secondary side is within the current band AR12, the carrier wave changing unit 116 sets the frequency of the carrier wave to the first carrier frequency. When the magnitude of the current on the secondary side is within the current band AR13, the carrier wave changing unit 116 sets the frequency of the carrier wave to the second carrier frequency.

When the magnitude of the current on the secondary side is within the current band AR11, the carrier wave changing unit 116 changes the frequency of the carrier wave depending on which of the frequency bands FR11, FR12, FR13, and FR14 the frequency on the secondary side falls within. For example, when the frequency on the secondary side is within the frequency band FR12, or when the frequency on the secondary side is within the frequency band FR13, the carrier wave changing unit 116 sets the frequency of the carrier wave to the first carrier frequency, and when the frequency on the secondary side is within the frequency band FR11, or when the frequency on the secondary side is within the frequency band FR14, the carrier wave changing unit 116 sets the frequency of the carrier wave to the second carrier frequency.

When the frequency on the secondary side is within the buffer band FR15, or when the frequency on the secondary side is within the buffer band FR16, or when the frequency on the secondary side is within the buffer band FR17, the carrier wave changing unit 116 does not change the frequency of the carrier wave. As described above, when the magnitude of the current on the secondary side is within the current band AR11, the frequency of the carrier wave is changed depending on which of the frequency bands FR11, FR12, FR13, and FR14 the frequency on the secondary side falls within, and thus the current band AR11 is an example of the above-described first current band.

In a case where the magnitude of the current on the secondary side is within the buffer band AR14, when the frequency on the secondary side is within the frequency band FR12, or when the frequency on the secondary side is within the frequency band FR13, the carrier wave changing unit 116 sets the frequency of the carrier wave to the first carrier frequency. In a case where the magnitude of the current on the secondary side is within the buffer band AR14, when the frequency on the secondary side is out of the frequency band FR12 and the frequency on the secondary side is out of the frequency band FR13, the carrier wave changing unit 116 does not change the frequency of the carrier wave. In the case where the magnitude of the current on the secondary side is within the buffer band AR14, changing the frequency of the carrier wave from the first carrier frequency to the second carrier frequency does not occur, because, in this case, the frequency of the carrier wave is not changed, even when the frequency on the secondary side is within the frequency band FR11 or FR14. On the other hand, when the frequency on the secondary side falls within the frequency band FR12 or FR13, the frequency of the carrier wave may be changed from the second carrier frequency to the first carrier frequency. Examples of such a case include a case where, in a state where the frequency of the carrier wave is held at the second carrier frequency after the magnitude of the current on the secondary side was changed, when the frequency on the secondary side was within the frequency band FR14, from a value within the current band AR11 to a value within the buffer band AR14, the frequency on the secondary side is changed through the buffer band FR15 to a frequency within the frequency band FR12. Thus, the buffer band AR14 is also an example of the above-described first current band.

In a case where the magnitude of the current on the secondary side is within the buffer band AR15, when the frequency on the secondary side is within the frequency band FR11, or when the frequency on the secondary side is within the frequency band FR14, the carrier wave changing unit 116 sets the frequency of the carrier wave to the second carrier frequency. In a case where the magnitude of the current on the secondary side is within the buffer band AR15, when the frequency on the secondary side is out of the frequency band FR11 and the frequency on the secondary side is out of the frequency band FR14, the carrier wave changing unit 116 does not change the frequency of the carrier wave. In the case where the magnitude of the current on the secondary side is within the buffer band AR15, changing the frequency of the carrier wave from the second carrier frequency to the first carrier frequency does not occur, because, in this case, the frequency of the carrier wave is not changed, even when the frequency on the secondary side is within the frequency band FR12 or FR13. On the other hand, when the frequency on the secondary side falls within the frequency band FR11 or FR14, the frequency of the carrier wave may be changed from the first carrier frequency to the second carrier frequency. Thus, the buffer band AR15 is also an example of the above-described first current band.

Figure 11:
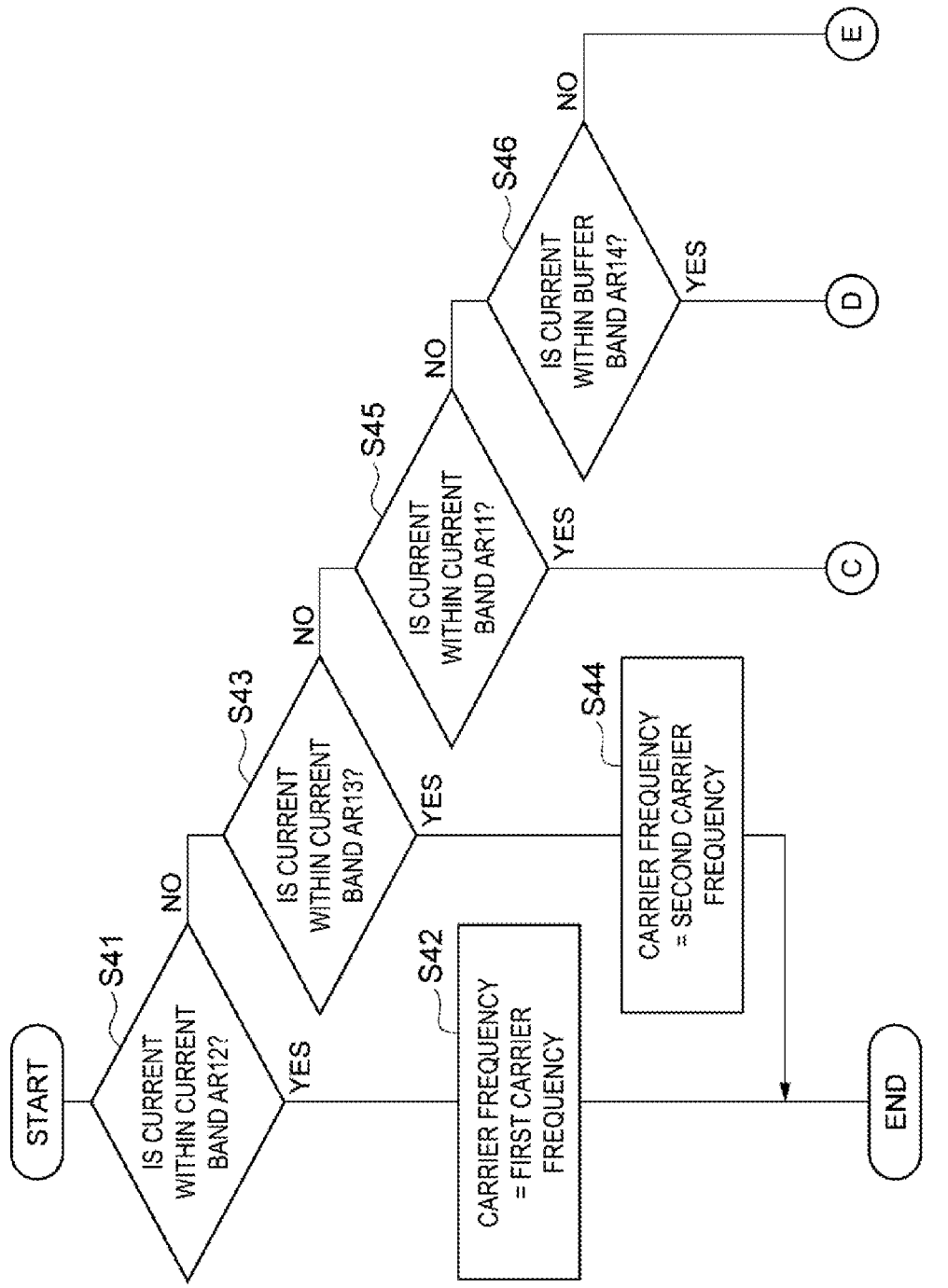
FIG. 11 is a flowchart illustrating an example of a setting procedure of the frequency of the carrier wave according to FIG. 10.

FIG. 11 is a flowchart illustrating an example of a setting procedure of the frequency of the carrier wave according to the example of FIG. 10. As illustrated in FIG. 11, the control circuit 100 first executes step S41. In step S41, the carrier wave changing unit 116 checks whether the magnitude of the current on the secondary side is within the current band AR12. In a case in which it is determined in step S41 that the magnitude of the current on the secondary side is within the current band AR12, the control circuit 100 executes step S42. In step S42, the carrier wave changing unit 116 sets the frequency of the carrier wave to the above-described first carrier frequency.

In a case in which it is determined in step S41 that the magnitude of the current on the secondary side is not within the current band AR12, the control circuit 100 executes step S43. In step S43, the carrier wave changing unit 116 checks whether the magnitude of the current on the secondary side is within the current band AR13. In a case in which it is determined in step S43 that the magnitude of the current on the secondary side is within the current band AR13, the control circuit 100 executes step S44. In step S44, the carrier wave changing unit 116 sets the frequency of the carrier wave to the above-described second carrier frequency.

In a case in which it is determined in step S43 that the magnitude of the current on the secondary side is not within the current band AR13, the control circuit 100 executes step S45. In step S45, the carrier wave changing unit 116 checks whether the magnitude of the current on the secondary side is within the current band AR11.

Figure 12:
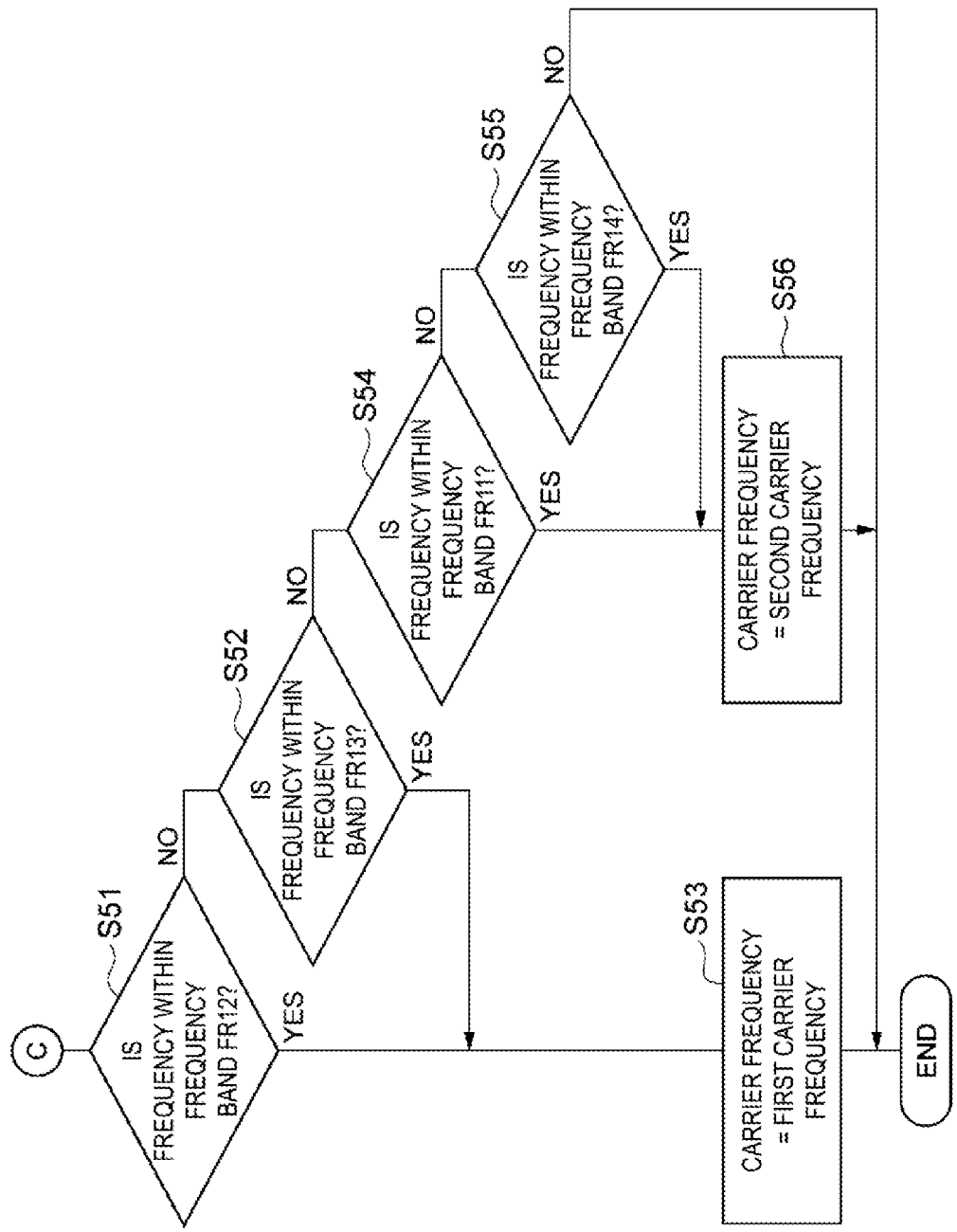
FIG. 12 is a flowchart illustrating an example of the setting procedure of the frequency of the carrier wave according to FIG. 10.

In a case in which it is determined in step S45 that the magnitude of the current on the secondary side is within the current band AR11, the control circuit 100 executes step S51, as illustrated in FIG. 12. In step S51, the carrier wave changing unit 116 checks whether the frequency on the secondary side is within the frequency band FR12. In a case in which it is determined in step S51 that the frequency on the secondary side is not within the frequency band FR12, the control circuit 100 executes step S52. In step S52, the carrier wave changing unit 116 checks whether the frequency on the secondary side is within the frequency band FR13. In a case in which it is determined in step S51 that the frequency on the secondary side is within the frequency band FR12, or it is determined in step S52 that the frequency on the secondary side is within the frequency band FR13, the control circuit 100 executes step S53. In step S53, the carrier wave changing unit 116 sets the frequency of the carrier wave to the above-described first carrier frequency.

In a case in which it is determined in step S52 that the frequency on the secondary side is not within the frequency band FR13, the control circuit 100 executes step S54. In step S54, the carrier wave changing unit 116 checks whether the frequency on the secondary side is within the frequency band FR11. In a case in which it is determined in step S54 that the frequency on the secondary side is not within the frequency band FR11, the control circuit 100 executes step S55. In step S55, the carrier wave changing unit 116 checks whether the frequency on the secondary side is within the frequency band FR14. In a case in which it is determined in step S54 that the frequency on the secondary side is within the frequency band FR11, or it is determined in step S55 that the frequency on the secondary side is within the frequency band FR14, the control circuit 100 executes step S56. In step S56, the carrier wave changing unit 116 sets the frequency of the carrier wave to the above-described second carrier frequency.

In a case in which it is determined in step S55 that the frequency on the secondary side is not within the frequency band FR14, the carrier wave changing unit 116 does not perform changing the frequency of the carrier wave in accordance with the frequency on the secondary side.

Returning to FIG. 11, in a case in which it is determined in step S45 that the magnitude of the current on the secondary side is not within the current band AR11, the control circuit 100 executes step S46. In step S46, the carrier wave changing unit 116 checks whether the magnitude of the current on the secondary side is within the buffer band AR14.

Figure 13:
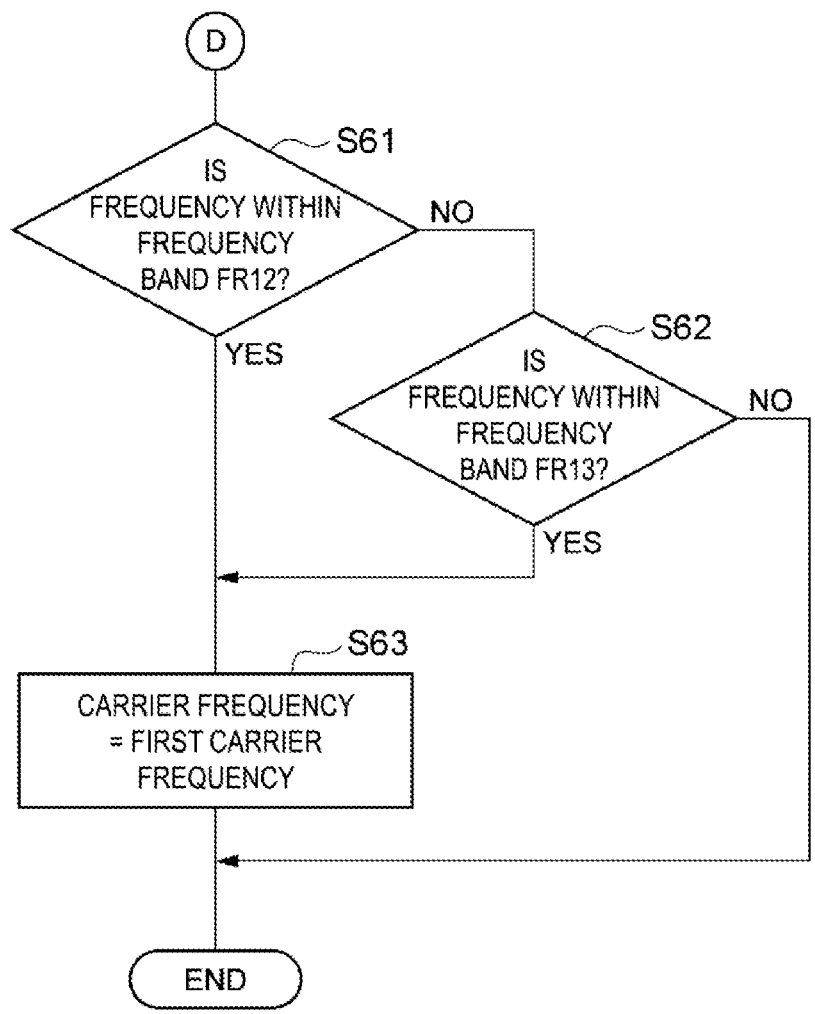
FIG. 13 is a flowchart illustrating an example of the setting procedure of the frequency of the carrier wave according to FIG. 10.

In a case in which it is determined in step S46 that the magnitude of the current on the secondary side is within the buffer band AR14, the control circuit 100 executes step S61, as illustrated in FIG. 13. In step S61, the carrier wave changing unit 116 checks whether the frequency on the secondary side is within the frequency band FR12. In a case in which it is determined in step S61 that the frequency on the secondary side is not within the frequency band FR12, the control circuit 100 executes step S62. In step S62, the carrier wave changing unit 116 checks whether the frequency on the secondary side is within the frequency band FR13. In a case in which it is determined in step S61 that the frequency on the secondary side is within the frequency band FR12, or it is determined in step S62 that the frequency on the secondary side is within the frequency band FR13, the control circuit 100 executes step S63. In step S63, the carrier wave changing unit 116 sets the frequency of the carrier wave to the above-described first carrier frequency.

In a case in which it is determined in step S62 that the frequency on the secondary side is not within the frequency band FR13, the carrier wave changing unit 116 does not perform changing the frequency of the carrier wave in accordance with the frequency on the secondary side.

Figure 14:
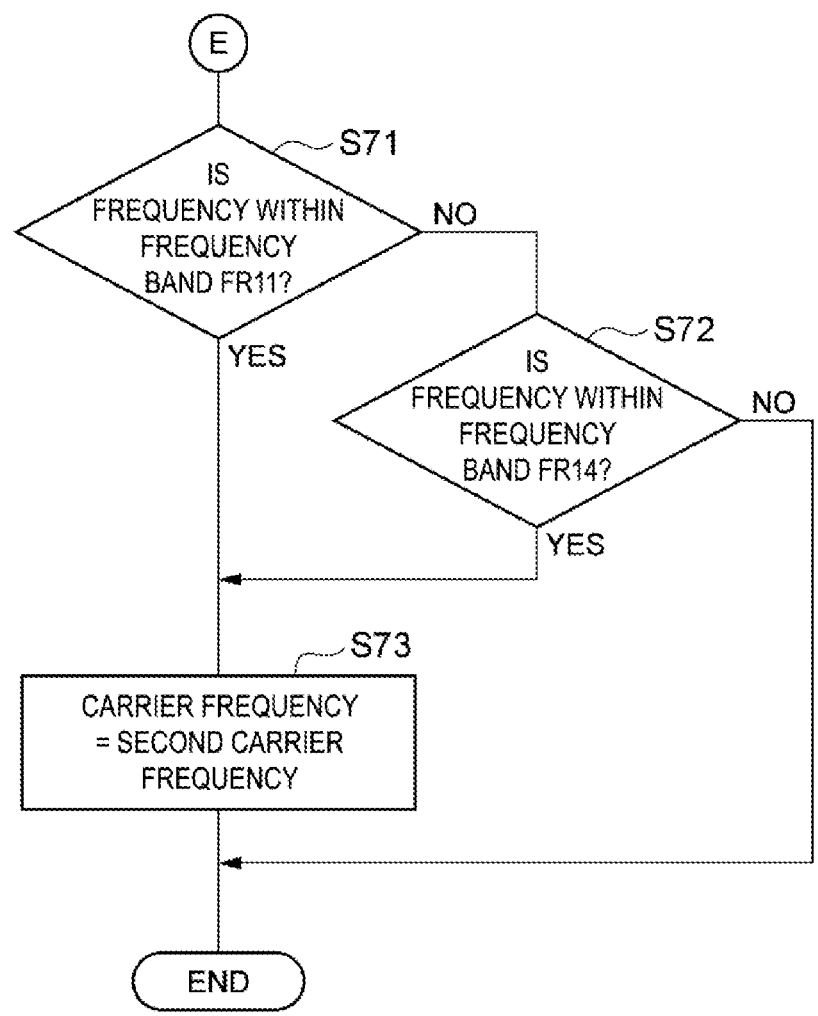
FIG. 14 is a flowchart illustrating an example of the setting procedure of the frequency of the carrier wave according to FIG. 10.

In a case in which it is determined in step S46 (see FIG. 11) that the magnitude of the current on the secondary side is not within the buffer band AR14, the control circuit 100 executes step S71, as illustrated in FIG. 14. In step S71, the carrier wave changing unit 116 checks whether the frequency on the secondary side is within the frequency band FR11. In a case in which it is determined in step S71 that the frequency on the secondary side is not within the frequency band FR11, the control circuit 100 executes step S72. In step S72, the carrier wave changing unit 116 checks whether the frequency on the secondary side is within the frequency band FR14. In a case in which it is determined in step S71 that the frequency on the secondary side is within the frequency band FR11, or it is determined in step S72 that the frequency on the secondary side is within the frequency band FR14, the control circuit 100 executes step S73. In step S73, the carrier wave changing unit 116 sets the frequency of the carrier wave to the above-described second carrier frequency.

In a case in which it is determined in step S72 that the frequency on the secondary side is not within the frequency band FR14, the carrier wave changing unit 116 does not perform changing the frequency of the carrier wave in accordance with the frequency on the secondary side. At this point, the setting of the frequency of the carrier wave is completed.

Effects of Present Embodiment

As described above, the power conversion device 1 includes the matrix converter circuit 10 including the plurality of switching elements and being configured to perform bidirectional power conversion between the alternating current power on the primary side and the alternating current power on the secondary side, the power conversion control unit 114 configured to switch on and off the plurality of switching elements in unison with the carrier wave to cause the alternating current on the secondary side to follow the control command, and the carrier wave changing unit 116 configured to change, based on the nearness level between the frequency on the primary side and the frequency on the secondary side, the frequency of the carrier wave.

Power loss in a switching element (power consumed in the switching element) includes switching loss due to switching between the ON state and the OFF state, and steady loss due to a current steadily flowing in the ON state. In the matrix converter circuit 10, the steady loss in each of the plurality of switching elements depends on a relationship upon switching to the ON state between the phase of the alternating current power on the primary side and the phase of the alternating current power on the secondary side.

When the nearness level between the frequency on the primary side and the frequency on the secondary side is high, the relationship between the phase of the alternating current power on the primary side and the phase of the alternating current power on the secondary side tends not to change. Accordingly, the steady loss in each of the plurality of switching elements also tends not to change. Therefore, in a switching element having a large steady loss, the state of having the large steady loss continues, and thus a large quantity of heat can be generated.

In such a case, the frequency of the carrier wave can be changed based on the nearness level, for example, the frequency of the carrier wave can be decreased, when the nearness level is higher than the predetermined level. Decreasing the frequency of the carrier wave results in decrease in the switching loss, and thus even in a switching element having a large steady loss, the switching loss can be decreased and power loss and heat generation can be reduced. Accordingly, the present power conversion device 1 is effective in reducing heat generated by a switching element.

The carrier wave changing unit 116 may change the frequency of the carrier wave further based on the magnitude of the current on the secondary side. Even in a state where the above-described nearness level is high, if the magnitude of the current on the secondary side is small, the quantity of heat generated in the switching element is small. Therefore, changing the frequency of the carrier wave further based on the magnitude of the current on the secondary side makes it possible to reduce the number of unnecessary changes of the frequency of the carrier wave.

The variable range of the magnitude of the current on the secondary side provided by the power conversion control unit 114 may include the first current band and the second current band lower than the first current band, and when the magnitude of the current on the secondary side is within the second current band, the carrier wave changing unit 116 may not perform changing the frequency of the carrier wave based on the nearness level, and when the magnitude of the current on the secondary side is within the first current band, the carrier wave changing unit 116 may perform changing the frequency of the carrier wave based on the nearness level. In this case, changing the frequency of the carrier wave based on the nearness level is performed in a limited manner based on the magnitude of the current on the secondary side, and thus the number of unnecessary changes of the frequency of the carrier wave can be reduced.

The variable range of the frequency on the secondary side provided by the power conversion control unit 114 includes the first frequency band including the same frequency as the frequency on the primary side, the second frequency band lower than the first frequency band, and the third frequency band higher than the first frequency band, and when the frequency on the secondary side is within the second frequency band, or when the frequency on the secondary side is within the third frequency band, the carrier wave changing unit 116 may set the frequency of the carrier wave to the first carrier frequency, and when the frequency on the secondary side is within the first frequency band, the carrier wave changing unit 116 may set the frequency of the carrier wave to the second carrier frequency lower than the first carrier frequency. In this case, changing the frequency of the carrier wave based on the nearness level can be realized with a simple logic.

The variable range of the frequency on the secondary side provided by the power conversion control unit 114 may further include the fourth frequency band lower than the second frequency band, and when the frequency on the secondary side is within the fourth frequency band, the carrier wave changing unit 116 may set the frequency of the carrier wave to the second carrier frequency. In a range from zero to a tuning frequency (the same frequency as the frequency on the primary side), as the frequency on the secondary side approaches zero, a period during which the ON state or the OFF state of each of the switching elements is held becomes longer, and thus the quantity of heat generated in each of the switching elements may increase. In such a case, decreasing the frequency of the carrier wave when the frequency on the secondary side is within the fourth frequency band closer to zero than the second frequency band makes it possible to reduce the switching loss in each of the switching elements and thus reduce power loss and heat generation in each of the switching elements. Accordingly, the power conversion device 1 is more effective in reducing heat generated by a switching element.

The power conversion device 1 may further include the filter 30 configured to reduce harmonics on the primary side, and the carrier wave changing unit 116 may use, as the second carrier frequency, a value higher than the cutoff frequency of the filter 30. In this case, it is possible to suppress increase in the ratio of high frequency components due to decreasing the frequency of the carrier wave.

The power conversion device 1 may further include the rated current changing unit 115 configured to decrease the rated current on the secondary side in accordance with increase in the frequency of the carrier wave, when the frequency of the carrier wave is higher than the predetermined threshold value, and to set the rated current on the secondary side to a fixed value, when the frequency of the carrier wave is lower than the threshold value, the power conversion control unit 114 may switch on and off the plurality of switching elements based on the rated current on the secondary side to limit the magnitude of the current on the secondary side, and the carrier wave changing unit 116 may use, as the second carrier frequency, a value lower than the threshold value. In this case, decreasing the frequency of the carrier wave to a frequency within a band in which the rated current on the secondary side is held by the rated current changing unit 115 at the fixed value makes it possible to more reliably reduce power loss.

Embodiments have been described above. However, the present disclosure is not necessarily limited to the embodiments described above, and various modifications are possible without departing from the scope of the present disclosure.

REFERENCE SIGNS LIST

1 Power conversion device
10 Matrix converter circuit
30 Filter
114 Power conversion control unit
115 Rated current changing unit
116 Carrier wave changing unit

The invention claimed is:

1. A power conversion device, comprising:
a matrix converter circuit including a plurality of switching elements, the matrix converter circuit being configured to perform bidirectional power conversion between alternating current power on a primary side and alternating current power on a secondary side;
a power conversion control unit configured to switch on and off, in unison with a carrier wave, the plurality of switching elements to cause a voltage or a current on the secondary side to follow a control command; and
a carrier wave changing unit configured to change, based on a nearness level of a frequency of the voltage or the current on the secondary side to a frequency of a voltage on the primary side, a frequency of the carrier wave, wherein the carrier wave changing unit changes the frequency of the carrier wave further based on a magnitude of the current on the secondary side,
a variable range of the magnitude of the current on the secondary side provided by the power conversion control unit includes a first current band and a second current band lower than the first current band,
when the magnitude of the current on the secondary side is within the second current band, the carrier wave changing unit does not perform changing the frequency of the carrier wave based on the nearness level, and
when the magnitude of the current on the secondary side is within the first current band, the carrier wave changing unit performs changing the frequency of the carrier wave based on the nearness level.

2. A power conversion device, comprising:
a matrix converter circuit including a plurality of switching elements, the matrix converter circuit being configured to perform bidirectional power conversion between alternating current power on a primary side and alternating current power on a secondary side;
a power conversion control unit configured to switch on and off, in unison with a carrier wave, the plurality of switching elements to cause a voltage or a current on the secondary side to follow a control command; and
a carrier wave changing unit configured to change, based on a nearness level of a frequency of the voltage or the current on the secondary side to a frequency of a voltage on the primary side, a frequency of the carrier wave, wherein
a variable range of the frequency of the voltage or the current on the secondary side provided by the power conversion control unit includes a first frequency band including the same frequency as the frequency of the voltage on the primary side, a second frequency band lower than the first frequency band, and a third frequency band higher than the first frequency band,
when the frequency of the voltage or the current on the secondary side is within the second frequency band, or when the frequency of the voltage or the current on the secondary side is within the third frequency band, the carrier wave changing unit sets the frequency of the carrier wave to a first carrier frequency, and
when the frequency of the voltage or the current on the secondary side is within the first frequency band, the carrier wave changing unit sets the frequency of the carrier wave to a second carrier frequency lower than the first carrier frequency.

3. The power conversion device according to claim 2, wherein
the variable range of the frequency of the voltage or the current on the secondary side provided by the power conversion control unit further includes a fourth frequency band lower than the second frequency band, and
when the frequency of the voltage or the current on the secondary side is within the fourth frequency band, the carrier wave changing unit sets the frequency of the carrier wave to the second carrier frequency.

4. The power conversion device according to claim 2, further comprising a filter configured to reduce harmonics on the primary side, wherein
the carrier wave changing unit uses, as the second carrier frequency, a value higher than a cutoff frequency of the filter.

5. The power conversion device according to claim 2, further comprising a rated current changing unit configured to decrease a rated current on the secondary side in accordance with increase in the frequency of the carrier wave, when the frequency of the carrier wave is higher than a predetermined threshold value, and to set the rated current on the secondary side to a fixed value, when the frequency of the carrier wave is lower than the threshold value, wherein the power conversion control unit switches on and off the plurality of switching elements based on the rated current on the secondary side to limit a magnitude of the current on the secondary side, and the carrier wave changing unit uses, as the second carrier frequency, a value lower than the threshold value.

6. A power conversion method, comprising:

switching on and off, in unison with a carrier wave, a plurality of switching elements of a matrix converter circuit to cause a voltage or a current on a secondary side of the matrix converter circuit to follow a control command, the matrix converter circuit being configured to perform bidirectional power conversion between alternating current power on a primary side and alternating current power on the secondary side; and changing, based on a nearness level of a frequency of the voltage or the current on the secondary side to a frequency of a voltage on the primary side, a frequency of the carrier wave, wherein a variable range of the frequency of the voltage or the current on the secondary side provided by a power conversion control unit includes a first frequency band including the same frequency as the frequency of the voltage on the primary side, a second frequency band lower than the first frequency band, and a third frequency band higher than the first frequency band, and the power conversion method further comprises:

when the frequency of the voltage or the current on the secondary side is within the second frequency band, or when the frequency of the voltage or the current on the secondary side is within the third frequency band, setting the frequency of the carrier wave to a first carrier frequency; and when the frequency of the voltage or the current on the secondary side is within the first frequency band, setting the frequency of the carrier wave to a second carrier frequency lower than the first carrier frequency.

* * * * *